United States Patent Office 2,877,108
Patented Mar. 10, 1959

2,877,108

METHOD FOR REDUCING METAL ORES

Rollin P. Smith, Stamford, Conn., and Donald E. Babcock, Youngstown, Ohio, assignors to R-N Corporation, New York, N. Y., a corporation of Delaware No Drawing. Application July 30, 1956
Serial No. 600,726

3 Claims. (Cl. 75—36)

This invention relates to a method for reducing ores. More specifically, this invention relates to an improvement in the reduction of a metallic ore such as iron ore at elevated temperatures, wherein the sensible heat of the reduced product is utilized for the charring of carbonaceous materials containing volatiles.

In the reduction of metal oxide ores to the corresponding metal, for example the reduction of iron ores to metallic iron, it is customary to employ carbonaceous reductants of various kinds. Where the carbonaceous reductant employed directly in the reducing operation contains substantial amounts of volatiles (as in the case of coal, sawdust, peat, lignite, or the like), difficulty is experienced in avoiding the escape from the reaction zone of unburned or partially-burned volatiles. Escape of such materials to the atmosphere involves a loss of heat values and also creates an air-pollution nuisance. Also it should be appreciated that in the event the volatiles condense in the apparatus, the tarry residues, etc., tend to coat and plug the equipment.

It has, therefore, been considered preferable in most cases to employ carbonaceous reductants low in volatiles (e. g. coke, chars or the like) for the actual reduction operation. Such materials are not readily available in nature as such, however, and it is therefore necessary to make low-volatile reductants from natural high volatile materials such as coal or the like. This involves a thermal stripping to remove the volatile constituents, and the heat necessary for this stripping is ordinarily provided by partial combustion of the material being treated. This, of course, also represents a substantial loss of theoretically-available heat values.

A further loss of heat values is introduced by the common practice of reducing ore at elevated temperatures and then cooling the product rapidly, for example by quenching it in water, to prevent reoxidation of the hot metal.

An object of this invention, therefore, is to provide a method for reduction of ores at elevated temperatures, which provides for efficient utilization of the sensible heat of the products of said reduction. Another object is to provide a process for reduction of ores at elevated temperatures, which avoids the necessity of intentionally dissipating sensible heat values of the products of reduction by quenching to avoid reoxidation. A still further object is to provide a process which provides for the use of a high-volatile carbonaceous raw material by converting the same to a low-volatile char, using said char as the reducing agent, and providing for efficient utilization of the volatile constituents originally contained in said high-volatile raw material.

These and other objects will become apparent from the following more complete description and claims.

Broadly, this invention contemplates an improvement in the reduction of ore at elevated temperatures wherein the reduction products containing appreciable sensible heat are juxtaposed in heat-transfer relationship with a carbonaceous raw material containing appreciable quantities of volatiles to char said carbonaceous material to produce a residue of solid char and a combustible volatile fraction.

In a particularly desirable embodiment, this invention contemplates a process of the type described in which the solid char and the combustible volatile fraction so produced are subsequently employed in the reduction of additional quantities of ore.

Throughout the present specification and claims, the term "carbonaceous raw material" is used to designate a "high-volatile" carbonaceous material such as coal or the like, containing appreciable amounts of combustible volatiles, and the term "char" is used to designate the relatively low-volatile and reactive residue remaining after thermal stripping of the volatiles from a "carbonaceous raw material."

The ore treated according to this process may be substantially any ore, the metallic values of which are reducible by carbonaceous reductants at elevated temperatures. This invention particularly contemplates, however, iron ores, especially low-grade iron ores of the "taconite" type. Similarly, the carbonaceous raw material may be any carbonaceous reductant containing appreciable amounts of combustible volatile materials which may be driven off by heat to leave a charred residue, but a non-coking type of coal is preferred. The combination of carbonaceous raw material and ore should, of course, be so chosen that the carbonaceous raw material can be charred at the temperature of the material discharged from the reduction operation.

The reduction of iron ore according to the process of this invention may be a partial reduction, for example reduction from hematite to magnetite or other lower oxides of iron, or it may be a substantially complete reduction to metallic iron. It may even be a complete reduction to metallic iron with fusion and consolidation of the iron formed, but this entails the use of complicated and expensive equipment for the effecting of the transfer of heat from the reduction products to the carbonaceous raw material for the purpose of volatilizing the volatile materials of the latter, and it is ordinarily preferred to utilize the process of this invention only in connection with partial reductions of the iron ore or with reduction to metallic iron under such conditions that fusion and consolidation do not take place. The heat transfer relationship above referred to may be direct contact and such is ordinarily preferred, providing suitable steps can conveniently be taken to subsequently separate the charred residue of the carbonaceous raw material from the reduction products, as will be hereinafter described.

When direct heat transfer is contemplated, it is necessary to take steps to prevent solidification of the mixture of kiln discharge and carbonaceous raw material or char, as there is a tendency for tars and the like, which are also liberated from the carbonaceous raw material during the charring operation, to mingle with the particles of kiln discharge and of char, fusing the whole into an undesirably coherent mass. This eventuality may be avoided by using a non-coking raw material in the first place, and by carrying out the operation in a vessel equipped with rabbling or other agitating means or by performing the operation in a fluidized-solids condition, using inert gas, natural gas or the like, or air as the fluidized medium.

The heat transfer relationship may also, however, be indirect, e. g. placing the hot reduced iron ore product in the outer chamber of a double-walled vessel and the carbonaceous raw material to be charred in the central chamber, or vice versa.

In a particularly desirable embodiment, this invention contemplates the reduction of relatively large lumps of iron ore with relatively finely-divided char at elevated temperature to produce a hot reaction product mixture consisting of relatively large lumps of reduced iron ore and relatively finely-divided excess char, mixing with said hot reaction product mixture a carbonaceous raw material containing appreciable amounts of combustible volatile materials, driving off the volatile materials from said carbonaceous raw material, collecting said volatile materials and utilizing them as fuels while still hot, if so desired, to maintain an elevated temperature for the reduction of additional quantities of iron ore, separating said relatively large lumps of reduced iron ore from said excess char and from the additional char as produced, and utilizing said excess char and said produced char for the reduction of additional quantities of iron ore. By "relatively large-sized," is meant substantially larger than the particle size of the "relatively finely-divided" char or other materials, the difference in size being sufficiently great to facilitate separation based on particle size, e. g., by screening or the like. In practice, it has been found convenient to employ iron ore in the form of lumps of one-half to one inch diameter and char and carbonaceous raw material of approximately 2 to 3 millimeters' diameter. Both the iron ore and such excess char as remains with the reduced iron ore product after reduction will be found to have retained substantially their original particle sizes through the reduction operation, provided adequate precautions are taken to prevent agglomeration.

As an alternative or variation of the process just described, the lumps of reduced iron ore may be separated from excess char in the product, and only the char mixed with the additional carbonaceous raw material to be charred. The separation should, of course, be carried out while the products of the reduction operation are still hot. The hot excess char supplies the heat necessary to drive off the volatile materials from the added carbonaceous raw material. These volatiles are collected and used as fuel for the maintenance of an elevated temperature for the reduction of additional ore. The char body, which comprises the original excess char and the new char formed by driving off the volatiles, may then be returned to the reduction operation.

Reverting to the question of the heat transfer relationship, it is, as noted above, preferable that this relationship be one of direct contact. Among the advantages of this mode of carrying out the process of this invention, is the fact that greater flexibility is thereby achieved with regard to the choice of the point at which the carbonaceous raw material to be charred is added to the reduction zone discharge. It may, for example, be mixed with the discharge from a rotary kiln in which the reducing operation takes place, and allowed to reside in contact therewith for a suitable period of time before separation. The residence may be in any suitable apparatus, for example, a shaft, conveyor, drum, or the like.

In order to more fully illustrate the nature and method of carrying out the process of this invention, the following example is presented:

*Example*

(1) An iron ore of the following analysis:

| | Percent |
|---|---|
| Total Fe | 34.9 |
| $SiO_2$ | 26.8 |
| $Al_2O_3$ | 5.1 |
| CaO | 9.2 |
| MgO | 0.2 |

Balance, oxide oxygen and incidental impurities, was fed into a rotary kiln together with char. The char had an average particle size of approximately 2 to 3 millimeters and the ore employed had been crushed and sized to lumps of ½" to 1½" diameter. The relative feed rates of ore and char were so adjusted as to introduce approximately 0.65 pound of char for every pound of ore introduced into the kiln. The kiln was heated by an oil-fired burner situated in the lower, or discharge, end of the kiln and adjusted to maintain a temperature between 1880° F. and 1920° F. in the lower third of the kiln in which the reducing reaction took place. Air and oil intake to the kiln were so regulated as to maintain a reducing atmosphere over the bed. The kiln speed was adjusted so as to subject the ore to an average residence time of 2.5 hours in the hot portion of the kiln. A mixture of reduced ore and residual char was discharged from the kiln at a temperature of 1900° F. Analysis of the discharge indicated that approximately 0.12 part of char had been consumed for each part of ore, during the time taken by the charge to traverse the kiln.

This hot (about 1900° F.) discharge product was fed directly into a second rotary furnace together with coal. The coal employed had been previously tested and found capable of producing 0.8 part of char for every part of coal. The relative feed rates of kiln discharge and coal introduced into the second furnace were so adjusted that 0.42 part of coal was introduced for each part of iron in the kiln discharge. This quantity of coal corresponded to 0.33 part of char for each part of iron, or 0.12 part of char for each part of the original feed ore, i. e. the amount consumed in the cycle just finished. A gas take-off was provided in the furnace and gas generated by charring of the coal therein was conducted directly back to the discharge end of the first kiln where it was burned in a gas burner. Owing to the additional heat thus provided to the kiln, it was found necessary to decrease the feed to the oil burner by approximately ¾ of its original value, in order to maintain the existing temperature conditions.

The discharge from the second furnace or kiln, after an average residence therein of thirty minutes, was a mixture of reduced iron ore with char, some of which was excess char introduced with the kiln discharge, and the remainder of which was freshly-prepared char made by the action of the hot kiln discharge upon the coal. The temperature of the discharge was about 1600° F. This discharge from the second rotary furnace was cooled and screened to remove the large lumps of reduced iron ore which were further processed to metallic iron. The freshly prepared char and excess char were then separated by a magnetic means from small particles of reduced iron ore produced by attrition in the kiln. The fine iron ore was consolidated with the remainder of the iron ore and also processed to metallic iron. The char was subsequently returned to the kiln together with additional iron ore and the cycle was repeated.

As has been indicated, according to a particularly preferred embodiment of this invention, the combustible volatiles produced by the charring operation are fed back into the combustion system of the reducing kiln. It, however, is to be appreciated that these volatiles may constitute an intermediate source of valuable chemical constituents, and therefore, they may, if desired, be collected and further processed, as is known to the art, for the recovery of same.

While this invention has been described with reference to certain specific embodiments and by way of certain examples, these are illustrative only and the invention is not to be considered as limited, except as set forth in the appended claims.

We claim:

1. In the reduction of iron ore, the improvement which comprises reducing relatively large lumps of iron ore with relatively finely-divided char at elevated temperature to produce a hot reduction product comprising relatively large lumps of reduced iron ore and relatively finely-divided excess char, admixing said hot reduction product with carbonaceous raw material containing appreciable quantities of combustible volatiles, thereby driving off said volatiles from said carbonaceous raw material and forming char therefrom, collecting said volatiles and utilizing them as fuels to maintain an elevated temperature for the reduction of additional quantities of iron ore, separating said relatively large lumps of reduced iron ore from said excess char and from the additional char so produced and utilizing said excess char and said produced char for the reduction of additional quantities of iron ore.

2. In the reduction of iron ore, the improvement which comprises reducing relatively large lumps of iron ore with relatively finely-divided char at elevated temperature to produce a hot reduction product comprising relatively large lumps of reduced iron ore and relatively finely-divided excess char, sizing said hot product to separate the hot char from said relatively large lumps of reduced iron ore, admixing said hot char with carbonaceous raw material containing appreciable quantities of combustible volatiles, thereby driving off said volatiles from said carbonaceous raw material and forming char therefrom, collecting said volatiles and utilizing them as fuels to maintain an elevated temperature for the reduction of additional quantities of iron ore, and utilizing said excess char and said produced char for the reduction of additional quantities of iron ore.

3. A process for reducing iron ore which comprises reducing iron ore in the presence of solid carbonaceous material at elevated temperature to produce a reduction product comprising reduced iron values, gangue, and carbonaceous material and containing appreciable sensible heat, juxtaposing said reduction product in heat-transfer relationship with a carbonaceous raw material containing appreciable quantities of volatiles to char said carbonaceous material whereby a residue of solid char and a combustible volatile fraction are produced, collecting said volatile fraction and utilizing it as fuel to maintain an elevated temperature for the reduction of additional quantities of iron ore, collecting said solid char residue and using same for the reduction of additional quantities of iron ore.

References Cited in the file of this patent
UNITED STATES PATENTS

| | | |
|---|---|---|
| 1,937,822 | Jones | Dec. 8, 1933 |
| 1,941,983 | Gudmundsen | Jan. 2, 1934 |